United States Patent [19]

Carré et al.

[11] 3,787,778

[45] Jan. 22, 1974

[54] ELECTRICAL FILTERS ENABLING INDEPENDENT CONTROL OF RESONANCE OF TRANSISITION FREQUENCY AND OF BAND-PASS, ESPECIALLY FOR SPEECH SYNTHESIZERS

[75] Inventors: René Carré; Jean-Pierre Beauviala, both of Grenoble; Jean Paille, Seyssinet, all of France

[73] Assignee: Agence Nationale De Valorisation De La Recherche (Anvar), Courbevoie, France

[22] Filed: Nov. 1, 1971

[21] Appl. No.: 194,427

Related U.S. Application Data

[63] Continuation-in-part of Ser. No. 47,287, June 18, 1970, abandoned.

[30] Foreign Application Priority Data

Oct. 30, 1970 France .............................. 70.39299
June 20, 1969 France .............................. 69.20702

[52] U.S. Cl. ........................ 330/86, 330/35, 330/85, 330/109

[51] Int. Cl. ............................................ H03f 1/36

[58] Field of Search ..... 330/21, 31, 35, 85, 86, 107, 330/109

[56] References Cited

UNITED STATES PATENTS 3,528,040 9/1970 Galvin .............................. 330/86 X

OTHER PUBLICATIONS

Moschytz, "Fen Filter Design Using Tantalum and Silicon Integrated Circuits," Proceedings of the IEEE, Vol. 58, No. 4, Apr. 1970, pp. 550–566.

Sallen et al., "A Practical Method of Designing RC Active Filters," IRE Transactions–Circuit Theory, Mar. 1955, pp. 74–85.

Mitra, "Synthesizing Active Filters," IEE Spectrum, Jan. 1969, pp. 47–61.

Bronzite, "Audio Spectrum Analyzer," Electronic Engineering, January 1968, pp. 27–31.

*Primary Examiner*—H. K. Saalbach
*Assistant Examiner*—James B. Mullins
*Attorney, Agent, or Firm*—Ostrolenk, Faber, Gerb & Soffen

[57] ABSTRACT

The filter comprises an amplifier of gain G of which the input is connected to a first pair of similar series connected impedances and whose impedance values are related by a constant $a$, and a second pair of similar impedances whose impedance values are related by a constant $b$, one of the latter pair of impedances being provided in a negative feedback loop and the other being shunted between the amplifier provided in the input and reference potential. The filter G and the aforesaid impedance values are characterized by the relationship $1+a-b\ (G-1) = 0$.

16 Claims, 12 Drawing Figures

INVENTORS
RENÉ CARRE
JEAN-PIERRE BEAUVIALA
JEAN PAILLE

BY
Ostrolenk, Faber, Gerb & Soffen
ATTORNEYS

INVENTOR
RENÉ CARRE
JEAN-PIERRE BEAUVIALA
JEAN PAILLE

BY
Ostrolenk, Faber, Gerb & Soffen
ATTORNEYS

INVENTORS
RENÉ CARRE
JEAN-PIERRE BEAUVIALA
JEAN PAILLE

BY
Ostrolenk, Faber, Gerb & Soffen
ATTORNEYS

INVENTORS
RENÉ CARRE
JEAN-PIERRE BEAUVIALA
JEAN PAILLE

BY
Ostrolenk, Faber, Gerb & Soffen
ATTORNEYS

INVENTORS
RENÉ CARRÉ
JEAN-PIERRE BEAUVIALA
JEAN PAILLE

BY
Ostrolenk, Faber, Gerb & Soffen
ATTORNEYS

INVENTORS
RENÉ CARRE
JEAN-PIERRE BEAUVIALA
JEAN PAILLE

BY
Ostrolenk, Faber, Gerb & Soffen
ATTORNEYS

INVENTORS
RENÉ CARRE
JEAN-PIERRE BEAUVIALA
JEAN PAILLE

BY

Ostrolenk, Faber, Gerb & Soffen
ATTORNEYS

ELECTRICAL FILTERS ENABLING INDEPENDENT CONTROL OF RESONANCE OF TRANSISITION FREQUENCY AND OF BAND-PASS, ESPECIALLY FOR SPEECH SYNTHESIZERS

This application is a continuation in part of copending application, Ser. No. 47,287, filed June 18, 1970 by the applicants of the present application, which application is now abandoned.

The invention relates to electrical filters enabling independent control of frequency and of bandpass; it relates more particularly, because it is in their case that its application appears to have most advantage, but not exclusively, among these filters, those intended for use in speech synthesizers.

It is a particular object of the invention to make controllable frequency and bandpass filters so that they respond better than hitherto to the various exigencies of practice, especially as regards the simplicity of their construction and independent controllability of frequency and of bandwidth.

The essential principles of format synthesizers and their applications will first be recalled.

The transmission of the word by telephonic route, either without special treatment, or with modulation by coded pulses (after sampling and quantification), necessitates a flow of the order of 30,000 bits per second, whilst the useful information to be transmitted only corresponds to a flow rate less by several orders of magnitude than this value. This is why it has been proposed to reduce this flow rate of 30,000 bits per second by only transmitting a certain number of parameters, considered indispensable, of speech, which requires, on emission, a parametric analysis of the spoken message and, on reception, a synthesis of the speech from the transmitted parameters. In such a transmission system, which requires at present a flow rate of the order of 1,000 bits per second, namely about ten times less than the normal transmission or with modulation by coded pulses, the parametric synthesis of the word on reception takes place by means of a synthesizer of which one of the known types is the formant synthesizer which comprises especially electrical sources, controllable gain amplifiers, controllable frequency filters, mixers and an electro-acoustic transducer. It will be noted that formant synthesizers serve not only in speech transmission systems, but also for producing the latter under the control of a computer, for example as output terminal facilitating relations between the machine and man. There are two categories of parametric formant synthesizers, namely synthesizers of the parallel type and synthesizers of the series type.

With reference to FIG. 1 of the accompanying drawings, there will be described the structure of a formant synthesizer of the series type, namely the OVE II synthesizer constructed at Stockholm by Messrs. Fant, Martoni, Rengman and Risberg. This synthesizer comprises:

a vocal source 1, which is a generator or electrical source, of which the frequency $F_0$ can be made to vary, with the purpose of simulating the effect of the vocal cords;

a noise (white) source 2, constituted by a generator or electrical source having the purpose of simulating noise sources due, in particular, to the friction of the air in the narrow parts of the vocal passage.

four amplifiers 3, 4, 5, 6 of variable gain Avn, Avv, Abv, Abb respectively, the two first amplifiers having their inputs connected to the output of the vocal source 1, whilst the two last amplifiers have their inputs connected to the output of the noise source 2;

a first mixer (or adder circuit) 7 with two inputs connected respectively to the outputs of the amplifiers 4 and 5;

a first channel Cn, called "nasal" channel, whose input is connected to the output of the amplifier 3 and which comprises filter-circuits 8, 9, 10, 11 and 12 whose transfer function contains a complex zero (anti-resonant circuit 8) and complex poles (resonant circuits 9, 10, 11 and 12) characterising the effect of the nasal cavities on the vocal source, the zeros and the poles, that is to say the anti-resonance and resonance frequencies, being fixed;

a second channel $Cv$, called "vocal" channel, whose input is connected to the output of the mixer 7 and which comprises filter-circuits 13, 14, 15 whose transfer function contains complex poles characterising the effect of the buccal cavities at the same time on the vocal source and on the noise source; it is the resonant circuits 13, 14, 15 which have controllable resonance frequencies $F_3$, $F_2$, $F_1$ respectively; these resonant circuits are called formant circuits (whence the name of this synthesizer), the formants being the zones of maximal energy of the word spectrum;

a third channel, Cb, called noise channel, whose input is connected to the output of the amplifier 6 and which comprises filter-circuits 16, 17 and 18 whose transfer function contains a complex zero (anti-resonant circuit 16) and complex poles (resonant circuits 17 and 18), characterising the total effect of the vocal passage in the presence of the noise source; resonant and anti-resonant circuits of controllable frequency $FB_o$, $FB_1$, $FB_2$ respectively are concerned;

a second mixer (or adder circuit 19) with three inputs connected respectively to the output of each of the three channels $Cn$, $Cv$ and $Cb$; and an electro-acoustic transducer or loudspeaker 20, whose input is connected to the output of the mixer 19.

In formant synthesizers of the usual type, the various filters, such as 13, 14, 15, 16, 17 and 18, with controllable resonance or anti-resonance frequency, have a constant bandwidth (or imposed by the effectively controlled frequency); now, it has been noted that it would be advantageous to be able to control independently the width of the band and the frequency of the polar or zero complex filters of the formant synthesizers of the type illustrated in FIG. 1, or of other types, in order to reconstitute human speech in a satisfactory manner.

The production and analysis of the human voice will be briefly recalled. The vocal cords, which are in the central region of the larynx, can be, either coupled or separated from one another by leaving between them an opening, of variable size, the glottis. Under the effect of the air pressure expired by the lungs during phonation, the vocal cords, constituting a flexible membrane which is opposed to the passage of the air, since the glottis is initially closed, open and close periodically, which is manifested by pulsing vibrations of the air at the output of these cords. The frequency of these pulses, called source frequency or melody frequency, varies between a little less than 100 Hz up to several hundreds of Hz, according to the nature of the voice. The series of pulses, which constitute the signal from the vocal source, have a very extended Fourier spectrum of which the amplitude of the lines or harmonics, in the steady state, decreases approximately as the inverse square of the frequency (drop of 12dB/octave).

The vocal source is not directly discerned by the hearer, but by means of the supraglottal cavities, that is to say occurring above the glottis (pharynx, buccal cavity, labial cavity, and nasal fossae) which constitute a complex resonant whole with variable filtering characteristics which depend on the shape and the sizes of the cavities and on the extension of the openings.

The supraglottal cavities will transmit, by reinforcing them or not, selectively, the components of the Fourier spectrum of the source. Due to the fact of the particular radiation characteristics of the mouth, the mean envelope of the spectrum perceived varies not approximately as the inverse square of the frequency, but only as the inverse of the frequency (decrease by 6dB/octave).

The frequency regions at maximal amplitudes, which correspond to the resonances of the cavities, are called formants. There is, in these regions, a concentration of accoustic energy.

A formant will usually be characterised by means of the three following parameters: frequency of maximum energy, bandwidth at 3dB, and intensity; these are exactly the parameters which can be made to vary in the synthesizer of FIG. 1.

It is obvious that the frequencies of the formants are independent of the spectrum of the vocal source, which only depends on the vibrations of the vocal cords.

The preceding spectrum will be characteristic of the sound perceived; the pitch will be characterized by the melody frequency and the tone by the configuration of the harmonics, that is to say by the formants.

It has long been acknowledged that the two first formants are mainly responsible for the particular tone of the vowels of our language. Other formants exist, which determine the secondary qualities of vowels (for example vowel a : $F_1 = 750$ Hz; $F_2 = 1,500$ Hz; $F_3 = 2,500$ Hz; vowel i : $F_1 = 300$ Hz; $F_2 = 2,700$ Hz; $F_3 = 3,300$ Hz).

The nasality, due to the influence of the nasal cavity, is often attributed to a special formant.

The foregoing relates to the vocalic aspect (or tonal or harmonic) of the word; in the word spectrum are also present noises.

The acoustic character of the noise is determined by its sound spectrum: a noise with predominantly high frequencies has a high-pitched character, whilst the predominance of low frequencies gives it a low-pitched character.

The noises present in the word spectrum are produced by various modifications of the air current coming from the lungs, which is either throttled so as to produce a friction, or momentarily blocked with subsequent sudden re-establishment.

It is the first means which comes into play when the consonants called fricative (*s, f, ch* . . . ) are pronounced; it is the noise belonging to the consonant (s) which contains the highest frequencies (8 to 9 kHz). The second means is used for the pronunciation of consonants called occlusive or explosive (*p, t, k* . . . ).

These various indications enable the word to be better understood, namely a sequence of recognisable transitory sound phenomena, grouped into a whole according to certain rules.

Now, analysis and synthesis provide the description of simultaneous variations of all the fundamental physical components of the word. At a given moment, it is hence possible to consider that certain of the parameters contribute to the perception of the preceding or following linguistic unit and that others are connected with the production of the linguistic unit of the moment.

Thus spectral analysis has established the rapid changes in frequency of formants in passing from the middle of the vowel to the middle of the consonant (or vice versa). Now, these transitions are revealed, by synthesis, not to be simple zones of passage from one sound to another but to constitute, in fact, the very heart of perception of the consonant.

It has been shown that the transfer function of a formant circuit is of the form: $T(p) = 1/\tau^2p^2 + 2\xi\tau p + 1$ in which formula appears a complex pole and in which $p = j\omega$ is the complex variable, $F = ½ \pi \tau$ and $\Delta F = \xi / \pi \tau$. F is the resonance frequency, Δ F is the bandpass at 3 dB.

Various studies have shown that, for a given formant, the frequency varies in a maximal ratio of 7 for the first formant. For the other formants, this ratio is less.

In addition, it was noted that the bandpass varies with the resonance frequency.

It was therefore advantageous to arrange a circuit of which the bandpass and the frequency could be controlled independently.

For anti-formant circuits simulating a complex zero the transfer function is : $T(p) = \tau^2p^2 + 2\xi \tau p + 1$ with $F = ½ \pi \tau$ and $\Delta F = \xi / \pi \tau$.

These circuits are used, in particular, for the production of non-vocal sounds.

For a given circuit, the anti-resonance frequency varies in a ratio of about 5, the upper frequency limit being 10,000 Hz.

Having recalled these known ideas, the invention seeks in fact to produce filters with independent control for frequency and bandpass, especially applicable in formant synthesizers.

It should however be noted that such filters can have other applications in any system requiring the presence of a filter with variable control for frequency and bandpass, for example in analysers of the human word useful either in transmitter stations with a transmission system for the word applying parametric analysis to the transmission and parametric synthesis to reception, or for language study, these analysers including a series of filters of this type. Such filters can also find their application in adaptative systems.

It is an object of the invention, to provide by way of a new industrial product, an electrical filter enabling independent control of the cut-off frequency and of the width of bandpass, characterized in that it comprises an amplifier whose gain is of the order of three and whose input is connected to two impedances of a first type which are arranged in series with respect to the said input and which have values adjustable and substantially equal, this amplifier being mounted with a negative feed-back loop formed between the output of the said amplifier and the junction between the two impedances of the first type, two other impedances of a second type, which have adjustable and substantially equal values, being respectively arranged in the negative feed back loop and shunted with respect to the input of the said amplifier.

In the case of a filter of the resonant circuit type whose transfer function comprises a complex pole, the input of the filter is connected to the input of the amplifier having a gain of the order of three by means of impedances of the first type and the output of this filter is constituted by the output of the said amplifier.

In a preferred embodiment according to the invention of a filter of the resonant circuit type, the impedances of the first type are constituted by adjustable resistances and the impedances of the second type are each constituted by an adjustable resistance and a condenser connected in parallel.

In the case of a filter of the anti-resonant circuit type whose transfer function comprises a complex zero, this filter includes also a second amplifier whose gain is of the order of a third and which is employed as an adder, a first input from this second amplifier being connected to the output of the amplifier having a gain of the order of three, the output of this second amplifier being connected to the input of the amplifier having a gain of the order of three through impedances of the first type, the input and the output of the filter being respectively constituted by a second input and by the output of this second amplifier.

In a preferred embodiment according to the invention of a filter of the anti-resonant circuit type, the impedances of the first type are each constited by an adjustable resistance and a condenser connected in parallel, and the impedances of the second type are constituted by adjustable resistances.

The invention relates also to control means independant of the resonance frequency and of the bandwidth of a filter, this control being either numerical (or digital), or analogic as explained in detail below.

It has further been observed that the condition imposing substantially equal values, respectively, on the impedances of the first and of the second types and, consequently, a gain of the order of three on the amplifier corresponds to a specific solution of the more general case for which the impedances of the first and of the second types have respective values which are in a given ratio.

With this generalization which forms the object of the present invention, the electrical filter can have, in certain cases, additional advantages over that to which the aforementioned patent application is directed, especially as regards: reduction in the influence of the frequency control element on the bandpass and conversely an improvement in the linearity of the control of frequency and of the bandpass.

It is an object of the invention to provide an electrical filter enabling the independent control of the resonance frequency and of the bandwidth which comprises an amplifier of gain G of which the input is connected to two impedances of a first type which are arranged in series with respect to the said input, have adjustable values and are such that the ratio between the value of the impedance connected directly to the input of the amplifier and the value of the other impedance is equal to $a$, the said amplifier being mounted with a negative feedback loop formed between the output of the said amplifier and the junction between the two impedances of the first type, two impedances of a second type which have adjustable values and are respectively arranged in the negative feedback loop and shunted with respect to the input of the said amplifier being such that the ratio between the value of the impedance which is shunted with respect to the input of the amplifier and the value of the other impedance is equal to $b$, characterized by the fact that at least one of the two ratios $a$ or $b$ is substantially different from 1 and that the ratios $a$ and $b$ and the gain $G$ of the amplifier are given by the relationship:

$$1 + a - b\,(G-1) = 0$$

In a particularly preferred embodiment of the electrical filter according to the invention, the impedances of one type are each constituted by an adjustable resistance and the impedances of the other type are each constituted by an adjustable resistance and a capacitor connected in parallel. Preferably, in this case, the overvoltage coefficient of the circuit comprising the amplifier of gain $G$ is greater than five and/or the ratios $a$ and $b$ are selected substantially equal to or greater than 1 and not exceeding a value of the order of 20.

The invention will in any case be more fully understood with the aid of the supplementary description which follows, as well as of the accompanying drawings.

FIG. 1 of these drawings, already described above, illustrates in the form of functional blocks, one embodiment of a formant synthesizer of the series type.

Figure 9:
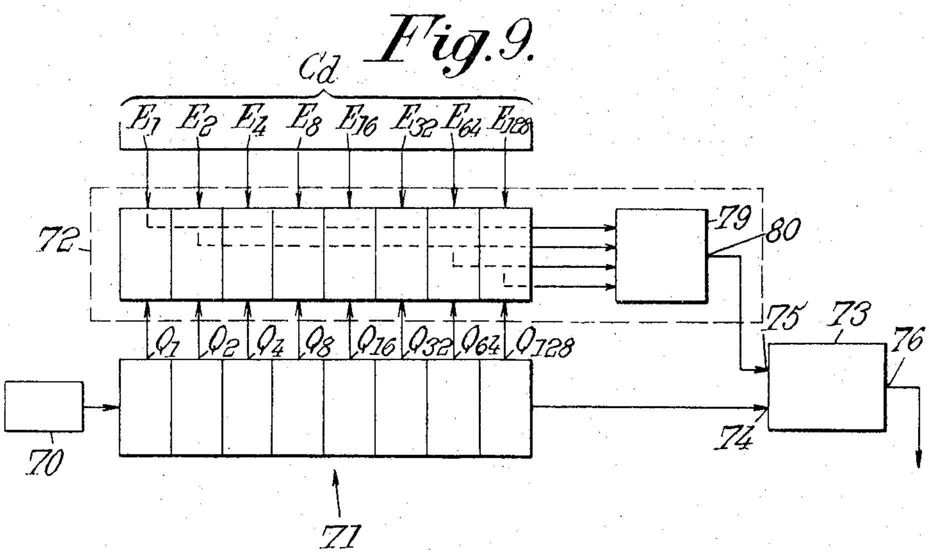
FIG. 9 illustrates, in the form of functional blocks, an embodiment of numerical control means for resonance frequency or of bandwidth of a filter according to the invention.
Figure 12:
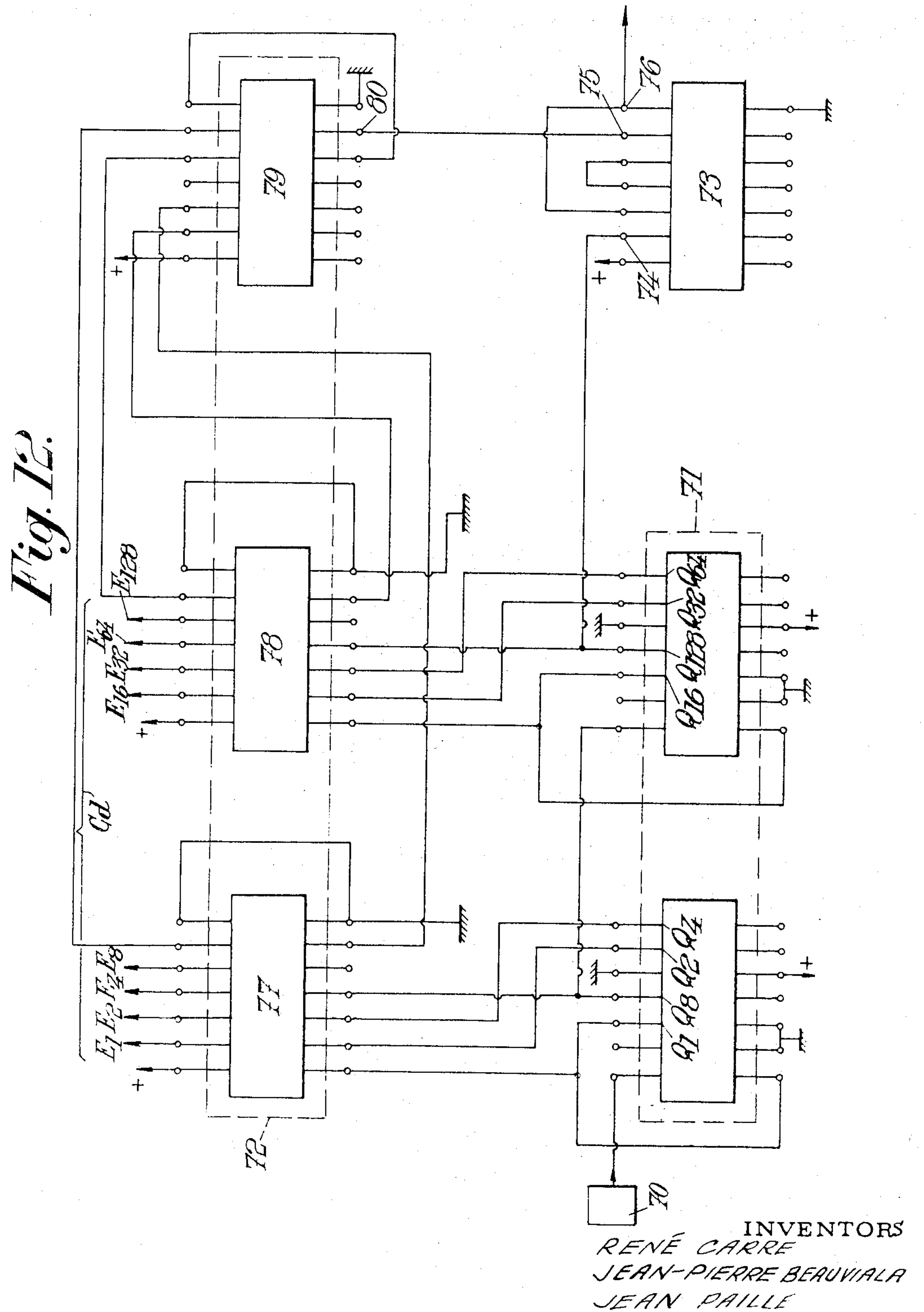

FIG. 12, lastly, illustrates in detailed manner the numerical control means of FIG. 9 produced, by way of example, with commercial components.

According to the invention, in order to produce an electrical filter with independent control of resonance frequency and of bandwidth, procedure is as follows or in analogous manner.

Filter $G_1$ (FIG. 2) is made to comprise an amplifier 21 whose gain $A_1$ is of the order of three and whose input 22 is connected to two impedances $Z_{1a}$ and $Z_{1b}$ of a first type which are arranged in series with respect to the said input 22 and which have adjustable and substantially equal values, this amplifier 21 being mounted with a negative feed-back loop 23 established between the output 24 of the said amplifier 21 and the junction 25 between the two impedances $Z_{1a}$ and $Z_{1b}$, two other impedances $Z_{2a}$ and $Z_{2b}$ of a second type, which have adjustable and substantially equal values, being respectively arranged in the negative feed-back loop 23 and in shunt with respect to the input 22 of the said amplifier 21.

In the case of the filter $G_1$ of FIG. 2 which, as will be seen below, is of a resonant type whose transfer function includes a complex pole, the input $E_1$ of the filter is connected to the input 22 of the amplifier 21 through impedances $Z_{1a}$ and $Z_{1b}$ and the output $S_1$ of this filter is connected to the output 24 of the said amplifier 21.

In this filter $G_1$ which is of a lowpass type, the impedances $Z_{1a}$ and $Z_{1b}$ of the first type are constituted by adjustable resistances $R_1$ and the impedances $Z_{2a}$ and $Z_{2b}$ of the second type are each constituted by an adjustable resistance $R_2$ and a condenser $C_2$ connected in parallel.

It is self-evident that this method of production is only an example of the filter and that the impedances $Z_{1a}$ and $Z_{1b}$ could be, for example, each constituted by a resistance in parallel with a condenser whilst the impedances $Z_{2a}$ and $Z_{2b}$ would each be constituted by a resistance. One would then have a filter $G_1$ of the highpass type.

There could again be impedances $Z_{1a}$ and $Z_{1b}$ each constituted by a resistance in series with a reactance and impedances $Z_{2a}$ and $Z_{2b}$ each constituted by a resistance. One would then have a filter $G_1$ of lowpass type.

In the case where the impedances $Z_{1a}$ and $Z_{1b}$ would be each constituted by a resistance and impedances $Z_{2a}$ and $Z_{2b}$ by a resistance in series with a reactance, one would have a filter $G_1$ of the highpass type.

Figure 3:
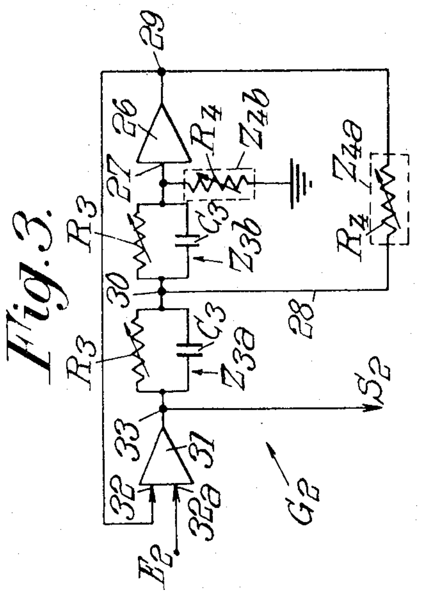
FIG. 3 illustrates in schematic manner an embodiment of a filter of the anti-resonant circuit type according to the invention.
Figure 2:
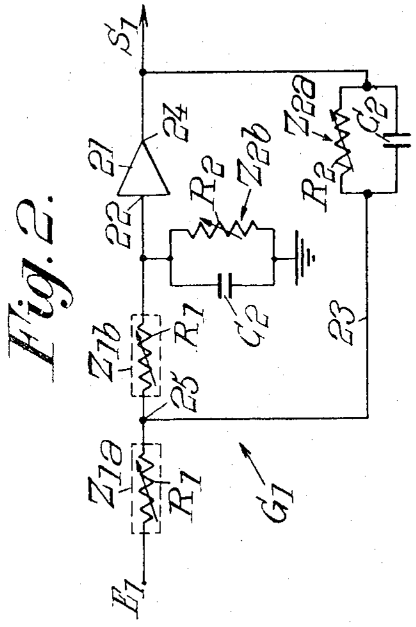
FIG. 2 illustrates in schematic manner an embodiment of a filter of the resonant circuit type according to the invention.

The filter $G_2$ of FIG. 3 comprises, similarly to filter $G_1$ of FIG. 2, an amplifier 26 whose gain $A_2$ is of the order of three and whose input 27 is connected to two impedances $Z_{3a}$ and $Z_{3b}$ of a first type which are arranged in series with respect to the said input 27 and which have adjustable and substantially equal values, this amplifier 26 being mounted with a negative feed-back loop 28 established between the output 29 of the said amplifier 26 and the junction 30 between the two impedances $Z_{3a}$ and $Z_{3b}$, two other impedances $Z_{4a}$ and $Z_{4b}$ of the second type, which have adjustable and substantially equal values, being arranged respectively in the negative feed-back loop 28 and in shunt with respect to the input 27 of the said amplifier 26.

In the case of the filter $G_2$ of FIG. 3 which, as will be seen below, is of the anti-resonant type whose transfer function includes a complex zero, this filter includes a second amplifier 31 whose gain $A_3$ is of the order of a third (⅓) and which is mounted as an adder, a first input 32 of this amplifier 31 being connected to the output 29 of the amplifier 26, the output 33 of this second amplifier 31 being connected to the input 27 of the amplifier 26 through impedances $Z_{3a}$ and $Z_{3b}$. The input $E_2$ and the output $S_2$ of this filter are respectively constituted by a second input 32a and by the output 33 of this second amplifier 31.

In this filter $G_2$ which is of a highpass type, the impedances $Z_{3a}$ and $Z_{3b}$ of the first type are each constituted by an adjustable resistance $R_3$ and a condenser $C_3$ connected in parallel, and the impedances $Z_{4a}$ and $Z_{4b}$ of the second type are constituted by adjustable resistances $R_4$.

As in the case of the filter $G_1$, it is self-evident that the method of construction presented is only an example and that the impedances $Z_{3a}$, $Z_{3b}$, $Z_{4a}$ and $Z_{4b}$ could be of another type.

For example, the impedances $Z_{3a}$ and $Z_{3b}$ could each be constituted by a resistance and the impedances $Z_{4a}$ and $Z_{4b}$ could then each be constituted by a resistance in parallel with a condenser. These impedances could also be of a non-capacitative type.

Figure 4:
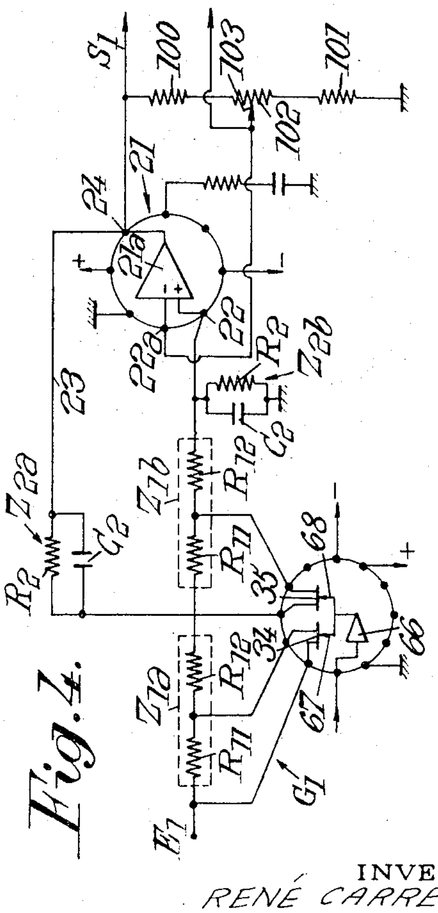
FIG. 4 illustrates in detailed manner the filter of FIG. 2 produced, by way of example, with commercial components.

As shown in detailed fashion in FIG. 4, the filter $G_1$ includes, with a view to adjustment of the gain $A_1$ of the amplifier 21, resistances 100, 101 and a potentiometer 102 which are mounted in shunt on the output 24 of an operational amplifier **21*a*, the voltage collected by the slider 103 of the potentiometer 102 being applied to a negative input 22*a* of this amplifier 21*a* to confer on the amplifier 21, by adjustment of the said potentiometer 102**, a gain $A_1$ substantially equal to three.

Figure 6:
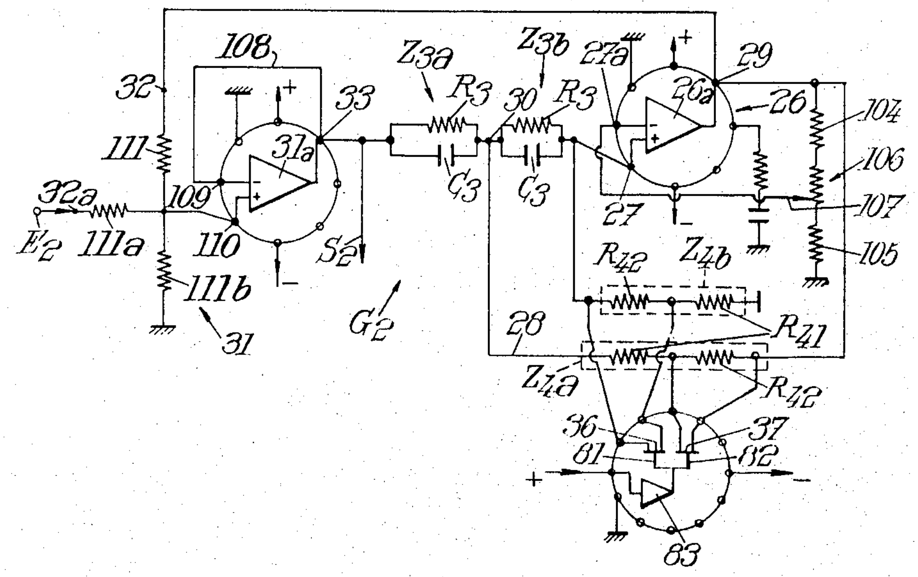
FIG. 6 illustrates in detailed manner the filter of FIG. 3 produced, by way of example, with commercial components.

As shown in detailed fashion in FIG. 6, the filter $G_2$ includes, with a view to adjustment of the gain $A_2$ of the amplifier 26, resistances 104, 105 and a potentiometer 106 which are mounted in shunt on the output 29 of an operational amplifier **26*a*, the voltage collected by the slider 107 of the potentiometer 106 being applied to a negative input 27*a* of this amplifier 26*a* to confer on the amplifier 26, by adjustment of the said potentiometer 106**, a gain $A_2$ substantially equal to three.

In the filter $G_2$, the amplifier 31 includes an operational amplifier **31*a* which is provided with a negative feed-back loop 108 connecting its output 33 to its negative input 109. The inputs 32 and 32*a* are connected to the positive input 110 of this amplifier 31*a* by equal resistances 111, 111*a*. In addition, a resistance 111*b* equal to the resistances 111 and 111*a* connects the input 110** to ground.

The assembly is such that the amplifier 31 has a gain $A_3$ substantially equal to a third.

In these embodiments of filters $G_1$ and $G_2$, the operational amplifiers **21*a*, 26*a* and 31*a*** are constituted by amplifiers of the type $\mu$ A 702 which are manufactured by the Fairchild firm.

By calculation and taking into account the fact that the gain $A_1$ of the amplifier 21 is equal to three, that $Z_{1a} = Z_{1b} = R_1$, that $(1/Z_{2a}) = (1/Z_{2b}) = C_2\,p + (1/R_2)$, the transfer function of the filter $G_1$ of FIG. 2 is:

$$\frac{V_s}{V_e}=\frac{3}{2\quad 2}, \qquad (1)$$

$$R_1^2\,C_2^2\,p + (2\,R_1/R_2)\,C_2\,p + 1 + (R_1/R_2^2)$$

$Vs$ and $Ve$ being respectively the complex voltages of the input and of the output of the filter.

Similarly, in the case of the filter $G_2$ of FIG. 3, taking into account the fact that the gain $A_2$ of the amplifier 26 is equal to three, that the gain $A_3$ of the amplifier 31 is equal to a third, that $1/Z_{3a} = (1/Z_{3b}) = C_3\,p + (1/R_3)$, that $Z_{4a} = Z_{4b} = R_4$, the transfer function of this filter is:

$$(Vs/Ve = ⅓\ [R_4^2\ C_3^2\ p^2 + (2\ R_4^2/R_3)\ C_3\ p + 1 + (R_4^2/R_3^2)] \qquad (2)$$

It is seen that the filter $G_1$ has a transfer function including a complex pole and, according to the expression (1) of this transfer function, one has, if $(R_1^2/R_2^2) << 1$:

$$F = (1/2\pi R_1 C_2) \quad (3)$$

$$\text{and } \Delta F = (1/\pi R_2 C_2) \quad (4)$$

F being the resonance frequency of the filter and $\Delta F$ being the bandwidth of the said filter. For $R_2 > 10R_1$, which corresponds to an excess voltage Q of the circuit over five, the error in F is 0.5 percent.

It is seen that the filter $G_2$ has a transfer function including a complex zero and, according to the expression (2) of this transfer function, one has, if $(R_4^2/R_3^2) << 1$:

$$F' = (1/2\pi R_4 C_3) \quad (5)$$

$$\text{and } \Delta F' = (1/\pi R_3 C_3) \quad (6)$$

F' being the transition frequency of the filter and ΔF' the bandwidth of the said filter. For $R_3 > 10R_4$, the error in F' is about 0.5 percent.

Figure 5:
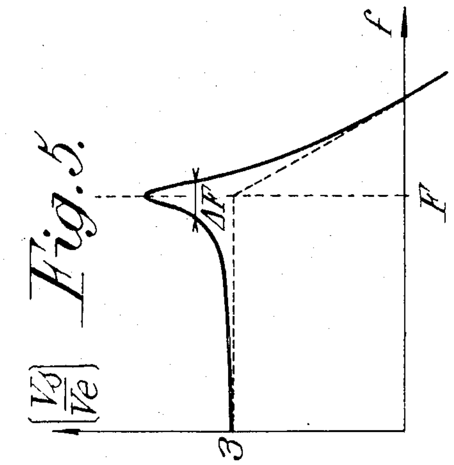
FIG. 5 shows, in the form of a curve, the variation as a function of frequency of the ratio of the input voltage to the output voltage of the filter of FIG. 4.
Figure 7:
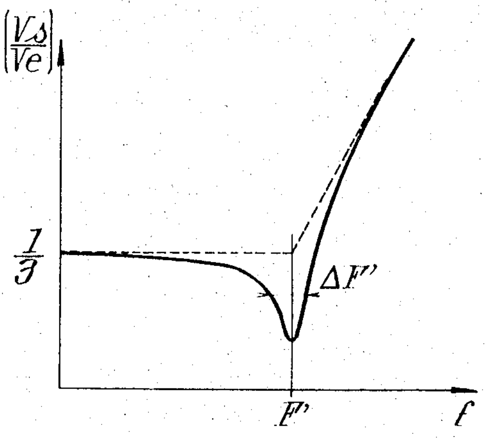
FIG. 7 shows, in the form of a curve, the variation as a function of frequency of the ratio of the input voltage to the output voltage of the filter of FIG. 6.

The values of the moduli of the transfer functions $(Vs/Ve)$ of the filters $G_1$ and $G_2$ are respectively given, as a function of frequency, by the curves of FIGS. 5 and 7 in which are indicated the frequencies F, F' and the bandpasses ΔF and ΔF'.

The expressions (3) and (4) show that a variation of the resistances $R_1$ of the filter $G_1$ involves a variation of the cut-off frequency F of this filter and that a variation of the resistances $R_2$ involves a variation of the bandwith ΔF of the said filter, the frequency F and the bandwidth ΔF being controllable independently of one another by controls independent of the conductances of the resistances $R_1$ and $R_2$.

The expressions (5) and (6) show that a variation of the resistances $R_3$ of the filter $G_2$ involves a variation of the bandwidth ΔF' of this filter and that a variation of the resistances $R_4$ involves a variation of the frequency F' of the said filter, the frequency F' and the bandwidth ΔF' being controllable independently of one another by controls independent of the conductances of the resistances $R_4$ and $R_3$.

Filters such as filter $G_1$ can constitute the resonant circuits 13, 14, 15, 17 and 18 of the synthesizer already described, whilst the filter $G_2$ can constitute the anti-resonant circuit 16 of the said synthesizer.

To control independently the frequency and the bandwidth of this filter, there are provided control means adapted to adjust independently the average conductances of the resistances of each type of impedance of a filter, by short-circuiting, periodically, portions of each of these resistances with a frequency distinctly greater than the resonance frequencies of the filter and for periods dependent, for each type of impedance, on the value of a control signal.

To effect this control, the resistances $R_1$ and $R_2$ of the filter $G_1$ are each constituted of two partial resistances. FIG. 4 shows only the resistances $R_{11}$ and $R_{12}$ enabling control of the cut-off frequency F of the filter $G_1$, the partial resistances resulting from the division of $R_2$ and enabling the control of the bandwidth ΔF of this filter not being shown with a view to simplification of the diagram.

In addition, at the terminals of the resistances $R_{11}$ assumed equal, are connected switches 34, 35 (constituted for example by field-effect transistors) which, when they receive an energising signal, short-circuit these resistances $R_{11}$.

Similarly, in the case of the filter $G_2$ (FIG. 6), the resistances $R_3$ and $R_4$ are each constituted by two partial resistances. FIG. 6 shows only resistances $R_{41}$ and $R_{42}$ enabling the control of the transition frequency F' of the filter $G_2$, the partial resistances resulting from the division of $R_3$ and enabling the control of the bandwidth ΔF' of this filter not being shown with a view to simplification of the diagram.

In addition, at the terminals of the resistances $R_{42}$ assumed equal, are connected switches 36, 37 (constituted for example by field-effect transistors) which, when they receive an energising signal, short-circuit these resistances $R_{42}$.

The switches 34, 35 and the amplifier 66 (FIG. 4) are constituted by an assembly of the type 2127BG type which is manufactured by the Almeco firm. Similarly, the switches 36, 37 and the amplifier 81 (FIG. 6) are constituted by an assembly of the 2127BG type.

In a general way, the control means of the frequency F of the filter $G_1$ periodically energises the switches 34, 35, short-circuiting the resistances $R_{11}$, whilst the control means of the bandwidth ΔF of this filter periodically energises switches (not shown), short-circuiting a partial resistance portion (not shown) of each resistance $R_2$.

Similarly, the control means for the frequency F' of the filter $G_2$ periodically energises the switches 36, 37, short-circuiting the resistances $R_{42}$ and the control means of the bandwidth ΔF' of this filter periodically energises switches (not shown), short-circuiting a partial resistance (not shown) of each resistance $R_3$.

These control means being analogous, there will only be described, to establish ideas, the control means of the frequency F of the filter $G_1$.

Figure 8:
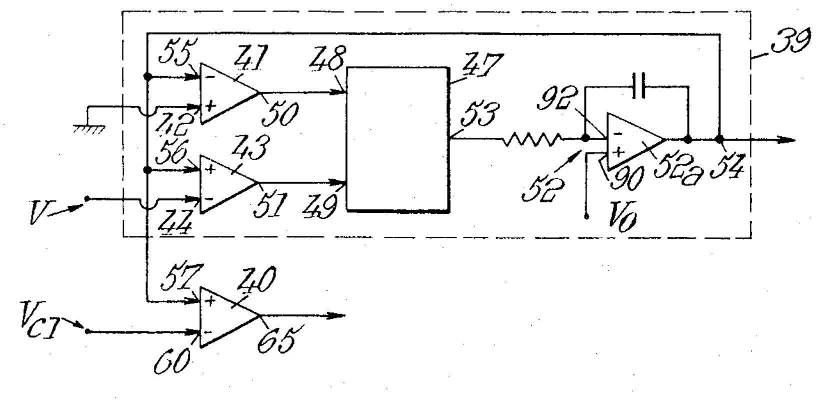
FIG. 8 illustrates, in the form of functional blocks, an embodiment of analogic control means of resonance frequency or of bandwidth of a filter according to the invention.
Figure 10:
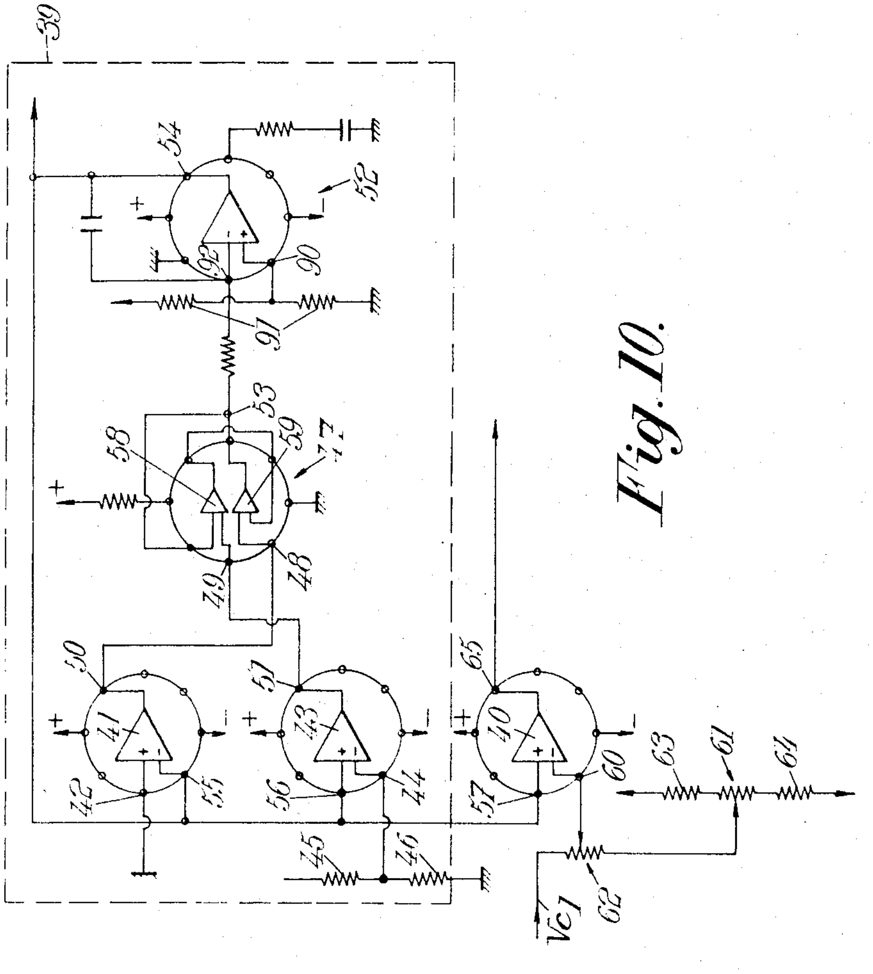
FIG. 10 illustrates in detailed manner the analogic control means of FIG. 8 produced, by way of example, with commercial components.

A first embodiment of these control means is illustrated in FIGS. 8 and 10. These control means receive a control signal $V_{c1}$ expressing, in analogue form and between limits which will be specified below, the value of the frequency F that the filter $G_1$ must have.

These control means include, on one hand, a signal generator 39 providing a saw-tooth signal, having a maximal amplitude V and a constant period T and, on the other hand, a comparator 40 adapted to compare the control signal $V_{c1}$, having a value comprised between O and V with the $s$ signal to provide to the switches 34, 35 energising signals as long as the signal $s$ has a value less than the control signal $V_{c1}$.

As shown in FIG. 8 and, in more detailed manner, in FIG. 10, the signal generator 39 comprises a first comparator 41 which receives on its positive input 42 nil voltage, a second comparator 43 which receives on its negative input 44 a voltage having the value V (through a voltage divider formed by the resistances 45, 46 shown in FIG. 10), a bistable flip-flop 47 with two control inputs 48 and 49 respectively connected to the outputs 50 and 51 of the comparators 41 and 43, and an integrator 52 (with operational amplifier 52$a$) which receives on a positive input 90 a signal $V_o$ furnished by a voltage divider 91 (FIG. 10) and on a negative input 92 the signal present at the output 53 of the flip-flop 47 and whose output 54 is connected to the negative input 55 of the comparator 41, to the positive input 56 of the comparator 43 and to the positive input 57 of the comparator 40 forming part of these control means.

In a manner known per se, the flip-flop 47 is formed by means of two looped gates NI 58 and 59 and it is adapted to furnish at its output 53 and according to its condition a signal of $V_2$ volts or of zero volts.

On the negative input 60 of the comparator 40 is applied the control voltage $V_{c1}$, which voltage $V_{c1}$ is maintained within the limits zero volts and V volts by means of potentiometers 61, 62 and resistances 63, 64.

Finally, the output 65 of the comparator 40 is connected, by means of an amplifier 66 (FIG. 4), to the control electrodes 67 and 68 of the transistors 34 and 35 acting as switches.

The flip-flop 47 is advantageously constituted by an assembly of the type RT$\mu$L 91429 of the Fairchild firm, the integrator 52 is constituted by an assembly $\mu$A 702 of the Fairchild firm and the comparators 40, 41 and 43 are constituted by assemblies $\mu$A 710 of the Fairchild firm.

There will now be described the operation of the filter $G_1$ provided with control means for the resonance frequency F of this filter, by referring more particularly to FIG. 11 in which is shown, as a function of time, the signal *a* present at the output 50 of the comparator 41, the signal *b* present at the output 51 of the comparator 43, he signal *c* present at the output 53 of the flip-flop 47, the signal *s* present at the output 54 of the integrator 52, the signals *s* and $V_{c1}$ present on the inputs 57 and 60 of the comparator 40 and the signal *e* present at the output 65 of the said comparator 40.

To fix ideas, it will be assumed that $V_2 = 2\ V$ and that $V_o = V$. These conditions involve a symmetry of the sawteeth of the signal *s* but it is self-evident that this is not indispensable.

As regards the signal generator 39, it will be assumed that at a moment $t_o$ the output 53 of the flip-flop 47 provides a signal *c* of value $V_2$ volts. The integrator 52 integrates the positive difference between the voltages $V_2$ volts and Vo volts and provides a signal *s* increasing from the value zero. At the instant $t_1$, this signal *s* reaches the value V and the comparator 43 changes state and provides on its output 51 a voltage front which causes the flip-flop 47 to change over which provides a signal *c* of value 0 volts. The integrator 52 integrates the negative difference between the voltages 0 volt and $V_o$ volts and then provides a decreasing signal *s*. At the moment $t_2$, the signal *s* reaches the value zero and the comparator 41 changes state and provides on its output 50 a voltage front which causes the flip-flop 47 to change over. It is thus seen that the integrator 52 provides on the input 57 of the comparator 40 a saw-toothed signal *s*.

In addition, the comparator 40 receives on its input 60 the control signal $V_{c1}$ and it provides on its output 65 a signal *e* when the value of $V_{c1}$ is greater than that of the signal *s*.

Figure 11:
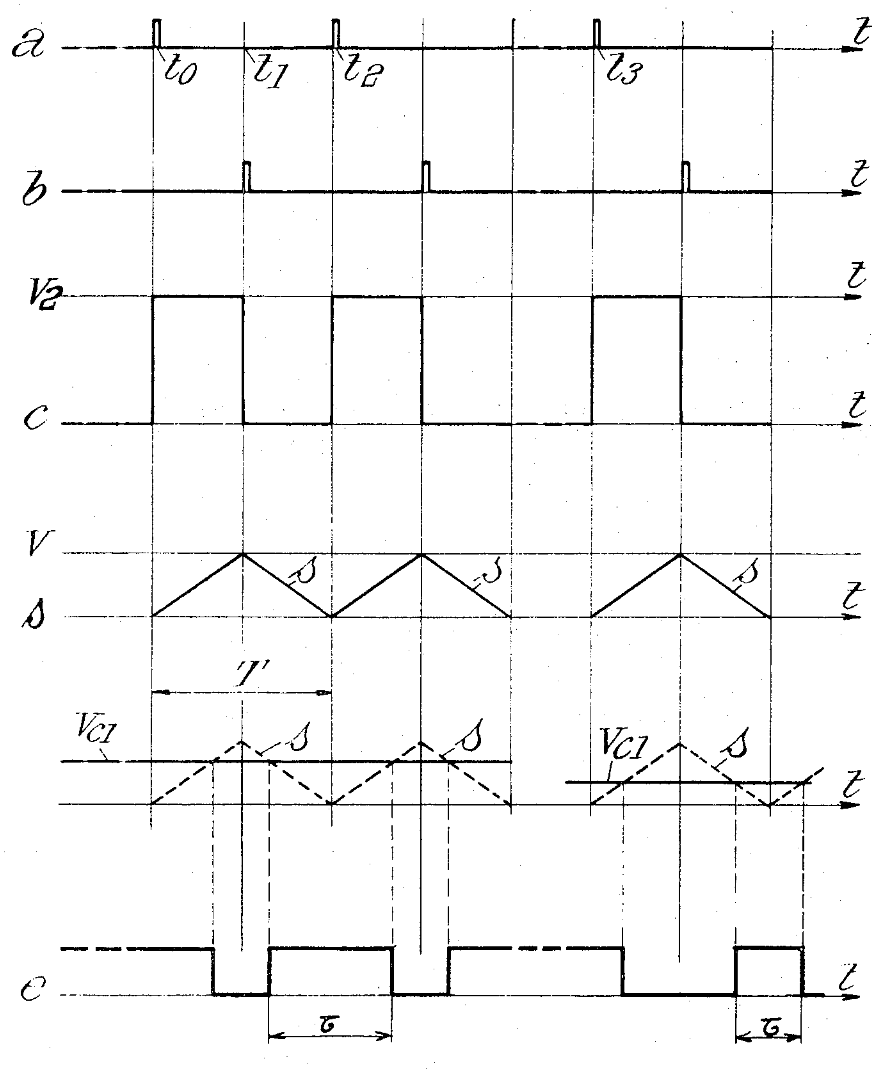
FIG. 11 illustrates, in the form of curves, the operation of the control means of FIG. 10.

It is seen in FIG. 11 that the signal *e* is formed of pulses having a period T equal to that of saw-toothed signal *s* and having durations $\tau$ expressed by:

$$\tau = (V_{c1}/V)\ .\ T \qquad (7)$$

It will be noted in particular that at an instant $t_3$ the control signal $V_{c1}$ has a value less than its value at the instant $t_o$ and that the corresponding pulses of the signal *e* have durations $\tau$ less than their values between the moments $t_o$ and $t_2$.

Taking into account the fact that the resistances $R_{11}$ of the filter $G_1$ are short-circuited during each pulse of duration $\tau$ of the signal *e*, the average value $R_{1m}$ of each resistance $R_1$ of this filter can be calculated. There is obtained:

$$(1)/(R_{1m}) = (1)/(R_{11}+R_{12}) + [(1)/(R_{12}) - (1)/(R_{11}+R_{12})]\ (V_{c1})/(V) \qquad (18)$$

Applying this value of $R_{1m}$ in formula (3) giving the value of the resonance frequency F of the filter $G_1$, it is seen that this frequency varies linearly with the control signal $V_{c1}$. In particular, if $V_{c1} = 0$, one has $F_{min} = 1/[2\pi\,(R_{11}+R_{12})\,C_2]$ and if $V_{c1} = V$, one has $F_{max} = 1/(2\pi R_{12}C_2)$. The limits of the level of variation of the resonance frequency F are hence very well defined. It is to be noted that the value $R_{1m}$ only depends on the value of the signal $V_{c1}$ and it is in particular independent of the period T of the saw-toothed signal *s*.

It is self-evident that control can be effected with identical control means $\Delta F$, F' or $\Delta F'$.

There can, for example, be provided for a same filter $G_1$ or $G_2$ two comparators such as the comparator 40, each receiving a saw-toothed signal *s* and receiving, in addition, respectively a control signal of the frequency and a control signal of the bandwidth, these comparators supplying respectively the energising signals to the switches short-circuiting the portions of the resistances of each of the types of the impedance.

In the case of the filter $G_1$, the periodic short-circuit at high frequency of the resistances $R_{11}$ or $R_{21}$ has no consequence on the signal treated by the filter, since the variations of this signal, as a result of the short-circuits, are absorbed by the filter itself which is a low-pass filter.

It is not the same in the case of the filter $G_2$ and the signal issuing from this filter must be filtered by a low-pass filter or again by a filter such as $G_1$ which would be placed in series with the filter $G_2$.

A second embodiment of these control means is illustrated in FIGS. 9 and 12.

These numerical control means act in the same manner as the analogue control means already described, by periodically energizing switches such as switches 34, 35 or 36, 37, short-circuiting the resistances $R_{11}$ or $R_{42}$.

To fix ideas, it will be assumed that these numerical control means act on a frequency F' of the filter $G_2$ by periodically energising the switches 36, 37 of this filter $G_2$.

These numerical control means receive a control signal $C_d$ expressing, in the form of parallel binary signals *q*, the value of the frequency F', which value can hence occupy $2^q$ different levels. In the example of application selected, $q = 8$ and the binary signals are respectively present on the inputs $E_1$, $E_2$, $E_4$, $E_8$, $E_{16}$, $E_{32}$, $E_{64}$, $E_{128}$.

These numerical control means include advantageously:

on one hand, a clock 70 adapted to provide a train of pulses of given frequency;

on the other hand, a counter 71 at $2^q$ successive states, hance adapted to count successively each group of $2^q$ pulses emitted from the clock 70;

and on the other hand again, a digital comparator 72 adapted to compare the contents of the counter 71 with the control signal $C_d$;

and, on the other hand lastly, a flip-flop 73 with two control inputs 74 and 75, this flip-flop being placed in a first state, for which it provides at its output 76 to the switches 36, 37 an energizing signal, when the counter 71 counts the last pulse of each group of $2^q$ pulses and being placed in its other state, for which the energising signal is suppressed, when the comparator 72 detects identity between the contents of the counter 71 and the control signal $C_d$.

The counter 71 is advantageously constituted by $q$ flip-flops. In the example selected, these flip-flops are eight in number and the contents of the counter 71 appear at each moment on the outputs $Q_1$, $Q_2$, $Q_4$, $Q_8$, $Q_{16}$, $Q_{32}$, $Q_{64}$ and $Q_{128}$ respectively controlled by each of the eight flip-flops.

These outputs $Q_1$, $Q_2$, $Q_4$, $Q_8$, $Q_{16}$, $Q_{32}$, $Q_{64}$ and $Q_{128}$ are connected to the corresponding inputs of the digital comparator 72 which receives also the control signal $C_d$ on the inputs $E_1$, $E_2$, $E_4$, $E_8$, $E_{16}$, $E_{32}$, $E_{64}$, $E_{128}$.

In the present case, the digital comparator 72 includes two multiple comparison circuits 77 and 78 (FIG. 12) and an AND gate 79 which delivers at its output 80 a pulse when the comparison circuits 77, 78 detect identity between the digital signals respectively present on the inputs $E_1$, $E_2$, $E_4$, $E_8$, $E_{16}$, $E_{32}$, $E_{64}$, $E_{128}$ and on the outputs $Q_1$, $Q_2$, $Q_4$, $Q_8$, $Q_{16}$, $Q_{32}$, $Q_{64}$, $Q_{128}$.

The control input 74 of the flip-flop 73 is connected to the output $Q_{128}$ from the counter 71 and the control input 75 of this flip-flop is connected to the output 80 of the AND gate 79. The output 76 of the flip-flop 73 is connected to the controls 81 and 82 of the field-effect transistors 36 and 37 through an amplifier 83 (FIG. 6).

The counter 71 is advantageously constituted by two assemblies of the SN 7493 N type of the Texas firm. The comparison circuits 77 and 78 are constituted by assemblies of the DM 8200 type of the National Semiconductors Corporation. The AND gate 79 is constituted by an assembly of the SN 7440 N type of the Texas firm and the flip-flop 73 is constituted by an SN 7400 N assembly of the Texas firm.

There will now be described the operation of these digital control means of the resonance frequency F' of the filter $G_2$, by relying on the numerical indications given in the description of these control means.

It will be assumed that the frequency of the pulses provided by the clock 70 to the counter 71 is equal to $F_m$ and that the desired value of the frequency F' corresponds to the level 128.

One has therefore:

$$E_1 = E_2 = E_4 = E_8 = E_{16} = E_{32} = E_{64} = \text{“0”} \qquad (9)$$

and $E_{128} = \text{“1”}$

At an instant $t_o$, the counter 71 counts the last pulse of a group of 256 pulses forming part of the train of pulses from the clock 70 and at this moment $t_o$, the output $Q_{128}$ of the counter changes state and actuates the placing in the first state or state "1" of the flip-flop 73. This flip-flop 73 provides at its output 76 a signal which energises the switches 36 and 37. The resistances $R_{42}$ are hence short-circuited.

At a moment $t_1$, the counter 71 counts the one hundred and twenty eighth pulse of a second group of 256 pulses having followed the preceding group and at this moment $t_1$, one has therefore:

$$Q_1 = Q_2 = Q_4 = Q_8 = Q_{16} = Q_{32} = Q_{64} = \text{“0”} \qquad (10)$$

and $Q_{128} = \text{“1”}$

There is hence identity between tha contents of the counter 71 and the control signal $C_d$ and the digital comparator 72 provides on its output 80 a signal which actuates the placing in the other state or "0" state of the flip-flop 73. There results the suppression of the energising signal of the switches 36 and 37.

At a moment $t_3$ which marks the arrival in the ocunter 71 of the last pulse of this second group, the cycle described above is renewed.

The frequency $f_1$ of the energising signals can hence be expressed by:

$$f_1 = (F_M/256) \qquad (11)$$

and corresponds to a constant period $T_1$ of these signals.

The duration $\tau_1$ of these energising signals can be expressed by:

$$\tau_1 = x/256 \, . \, T_1 \qquad (12)$$

$x$ being the level selected for the frequency F', which level is comprised between the values zero and 256.

By analogy with the previous calculation, there may be calculated the average value $R_{4m}$ of each resistance $R_4$ of the filter $G_2$. There is obtained:

$$1/(R_{4m}) = 1/(R_{41} + R_{42}) + [(1/R_{41}) - (1/R_{41} + R_{42})] \, . \, (x/256) \qquad (13)$$

Introducing this value of $R_{4m}$ into the formula (5) giving the value of the transition frequency F' of the filter $G_2$, it is seen that this frequency varies linearly with the value of the level defined by the control signal $C_d$.

This being the case and whatever the embodiment adopted, there is obtained a filter which responds well to the objects which it was thought to achieve.

It is to be noted that filter of this type can, in addition to the examples of use already given, be also used in the production of filters of the Tchebycheff or Butterworth type.

A description will now be given of a more generalized filter configuration than that described hereinabove. The electrical filter of the more generalized configuration is shown in FIG. 2 and comprises an amplifier 21 of gain G of which the input 22 is connected to two impedances in series $Z_{1b}$ and $Z_{1a}$ of a first type and of respective adjustable values $aZ_1$ and $Z_1$, which are in the preferred embodiment illustrated adjustable resistances of values aR and R, the impedance $Z_{1b}$ being connected directly to the input 22 of the amplifier 21 and the terminal $E_1$ of the impedance $Z_{1a}$, which is not connected to the impedance $A_{1b}$, constituting the input of the filter.

This amplifier 21 is mounted with a negative feedback loop 23 formed between the output $S_1$ and the junction 25 between the impedances $Z_{1b}$ and $Z_{1a}$, two other impedances $Z_{2a}$ and $Z_{2b}$ of a second type, which have adjustable respective values $Z_2$ and $bZ_2$, being respectively arranged in the negative feedback loop 23 and shunted with respect to the input 22 of the said amplifier 21. The output of the filter is constituted by output 24 of the amplifier 21. The impedance $Z_{2a}$ is, in the preferred embodiment shown, the assembly of an adjustable resistance of value $R_2$ and of a capacitor of capacity $C_2$ in parallel.

Figure 1:
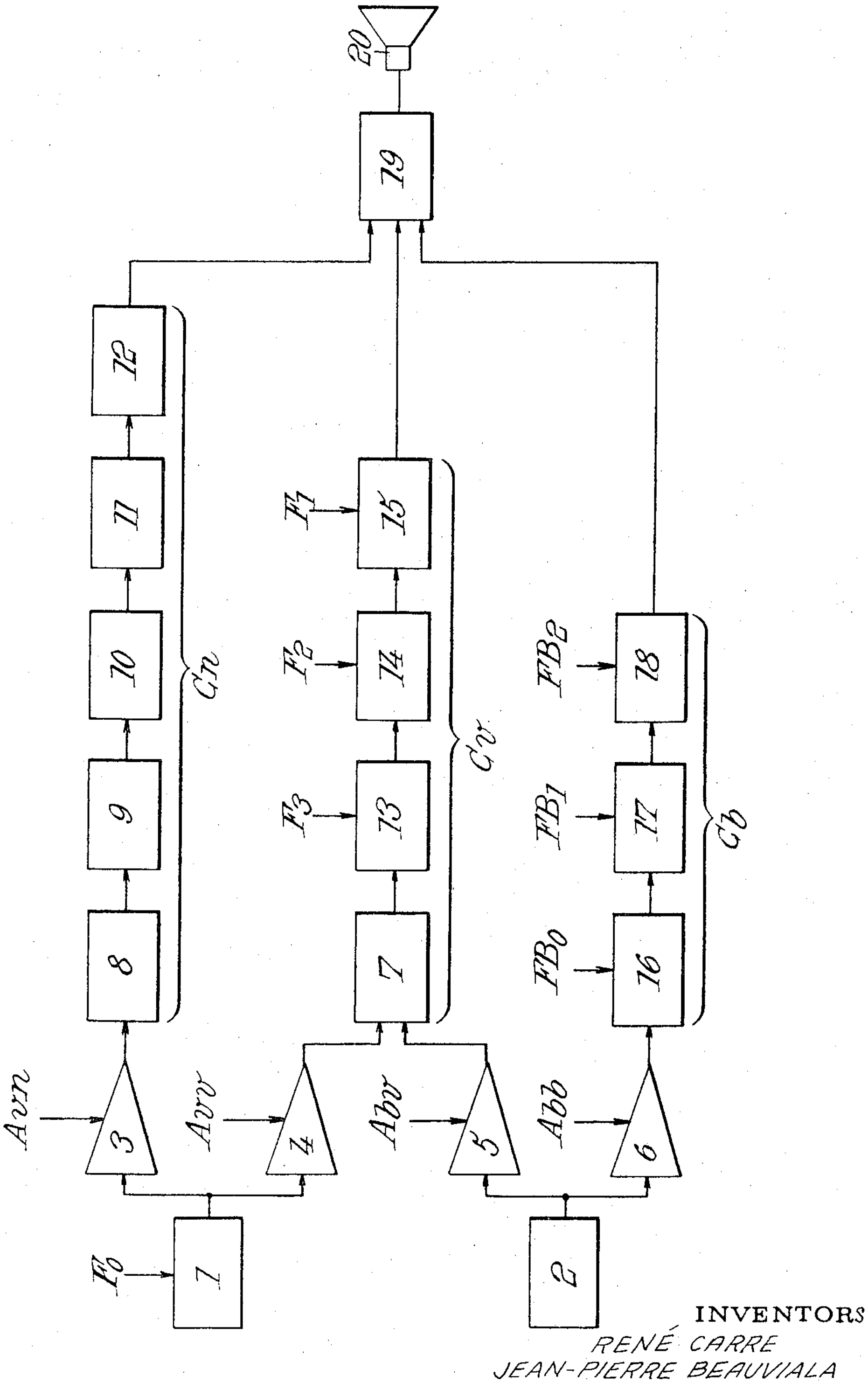

It is shown by the calculation that the transfer function, which is the ratio between the complex output voltage Vs and the complex input voltage Ve, of the filter shown in FIG. 1 is:

$$\frac{V_s}{V_e}=\frac{bG}{b+a\left(\frac{Z_1}{Z_2}\right)^2 p+\frac{Z_1}{Z_2}p[1+a+b(1-G)]}$$

If $Z_1$ and $Z_2$ are replaced by their preferred values and if the relationship $1 + a + b\,(1-G) = 0$ is satisfied, the transfer function written above becomes:

$$\frac{Vs}{Ve}=\frac{\dfrac{G}{1+\frac{a}{b}\frac{R_2^2}{R_2^{12}}}}{1+\dfrac{\frac{2a}{b}\frac{R_1^2G}{R_2^1}}{1+\frac{a}{b}\frac{R^2}{R_2^{12}}}p+\dfrac{\frac{2}{b}R_1^2C^2}{1+\frac{a}{b}\frac{R_1^2}{R_2^{12}}}p^2}$$

where p is the Laplac operator.

This transfer function has the conventional general form which is that of a filter circuit called a filter of formant that is to say of an electrical filter of the resonance circuit type of which the transfer function is of the second order and comprises a complex pole. The calculation shows that if the overvoltage coefficient Q of the circuit is sufficiently great, the quantity $(a/b)$ $(R_1^2/R_2^2)$ is small with respect to 1, which gives the following values for the resonance frequency and the band-pass:

$$F\simeq\frac{1}{2RC\sqrt{\frac{a}{b}}}\text{ and }\Delta F\simeq\frac{1}{R_2c}$$

This electrical filter, of the resonant type of which the transfer function comprises a complex pole, is hence such that its resonance frequency and its band-pass can be made to vary independently.

It should be noted that the expressions given above for F and ΔF are not strictly true but are good approximations, that is to say the resonance frequency F depends, to a small extent, on the resistance of value R′ and its variation as a function of R is not perfectly linear; similarly, the band-pass ΔF depends, to a small extent on the resistance of value R and its variation as a function of R′ is not perfectly lienar. For example, if the overvoltage coefficient Q is greater than five and if the ratios a and b are equal, the relative error on the frequency F is less than 0.5 percent.

It may be useful, for high qualify circuits, to minimize these interactions and to increase linearity of the controls. Calculation shows that the errors in the expressions given above, for the frequency F and the band-pass ΔF, are minimal when $a$ and $b$ are substantially equal and large. However, considerations of a practical nature lead to the limiting of the qualities $a$ and $b$ to values greater than 1 which do not exceed about 20. It should be noted that, in this case, the gain G of the amplifier is comprised between two and three.

The electrical filter shown in FIG. 3 is composed of a first portion which comprises, like the filter described above in FIG. 2, an amplifier 26 of gain G of which the input 27 is connected to two impedances in series $Z_{3b}$ and $Z_{3a}$ of the first type and of adjustable values, the impedance $Z_{3b}$ directly connected to the input 27 of the amplifier 26 having the value $aZ_3$, the other impedance $Z_{3a}$ having the value $Z_3$, this amplifier 26 being mounted with a negative feedback loop 28 formed between its output 29 and the junction 30 between the impedances $Z_{3b}$ and $Z_{3a}$, two other impedances $Z_{4b}$ and $Z_{4a}$ of a second type which have adjustable respective values $Z_4$ and $bZ_4$, being arranged respectively in the negative feedback loop 28 and shunted with respect to the input 27 of the amplifier 26.

The filter shown in FIG. 3 comprises, in addition, a second portion which comprises a second amplifier 31, mounted as an adder, the gain of which is of the order of the reciprocal 1/G of the gain of the first amplifier 26, a first input 32 of this amplifier 31 being connected to the output 29 of the amplifier 26, the output 33 of the second amplifier 31 being connected to the input 27 of the amplifier 26 through impedances $Z_{3a}$ and $Z_{3b}$. The input $E_2$ and the output $S_2$ of this filter are respectively constituted by a second input 32a and by the output 33 of this second amplifier 31.

Calculation shows that the transfer function of this filter is represented by the expression:

$$\frac{Vs}{Ve}=\frac{1}{G}\left[1+\frac{b}{a\left(\frac{Z_3}{Z_4}\right)^2+\left(\frac{Z_3}{Z_4}\right)[1+a+b(1-G)]}\right]$$

In the preferred embodiment shown of this filter, each of the impedances $Z_{3b}$ and $Z_{3a}$ are constituted by a resistance of adjustable value in parallel with a capacitor of capacity $C_3$ and for the impedances $Z_{4a}$ and $Z_{4b}$ resistances of adjustable respective values $R_4$ and $bR_4$ are taken.

One can thus write $Z_4 = R_4$ and $Z_3 = R_3/(1 + R_3 C_3 P)$ where $R_3$ is the value of the resistance comprised in the impedance $Z_{3a}$.

In this case, the transfer function of the filter is, if the relationship $1 + a + b\,(1-G) = 0$ is satisfied:

$Vs/(Ve) = 1/G\,[1 + (b/a)\,(R_4/R_3)^2 + 2\,(b/a)\,(R_4/R_3)^2 C_3P + (b/a)\,R_4^2\,C_3^2\,P^2]$

This transfer function has the general conventional form which is that of a filter circuit called a filter of anti-formant, that is to say of an electrical filter of the anti-resonant circuit type of which the transfer function is of the second order and comprises a complex zero.

It is shown that if the overvoltage coefficient Q of the first portion of the circuit of this filter, which is identical with the circuit shown in FIG. 2, is sufficiently large, the quanity $(b/a)\,(R_4/R_3)^2$ is small relative to 1, which gives the following values for the transition frequency F and for the band-pass Δ F:

$F = 1/(2\pi\,R_4\,C_3)\quad\sqrt{(a/b)}$ and $\Delta F = 1/(\pi\,R_3\,C_3)$

This electrical filter of the anti-resonant circuit type of which the transfer function comprises a complex zero, is hence such that its transition frequency and its band-pass can be varied in independent manner.

Considerations entirely similar to those envisaged in the case of the resonant filter circuit enable it to be said that the errors in the expressions of the frequency F and of the band-pass Δ F given above are minimal when the quantities $a$ and $b$ are substantially equal and are values greater than 1 and not exceeding about 20.

The filters which have just been described could, of course, be provided with analogue or digital control means of frequency and of band-pass such as those described in the above-mentioned patent application.

As is self-evident and as emerges already besides from the preceding description, the invention is in no way limited to those of its methods of application, nor to those of its methods of production of its various parts, which have been more particularly indicated; it embraces, on the contrary, all variations, especially those where filter-circuits will be used in which the impedances constituted by a resistance and a condenser connected in parallel and the impedances constituted by a resistance would be permuted with respect to their arrangement in the present circuits or again in which inductances would be introduced in place of condensers.

We claim:

1. Electrical filter enabling independent control of resonance or transition frequency and of bandwidth which comprises an amplifier of gain G whose input is connected to two impedances $Z_{1A}$ and $Z_{1B}$ of a first type which are arranged in series with respect to the said input, have adjustable values and are such that the ratio between the value of the impedance $Z_{1B}$ connected directly to the input of the amplifier and the value of the other impedance $Z_{1A}$ is $Z_{1B} = a\, Z_{1A}$, said amplifier being provided with a negative feedback loop between the output of the said amplifier and the junction between the two impedances $Z_{1A}$ and $Z_{1B}$, two other impedances $Z_{2A}$ and $Z_{2B}$ of a second type which have adjustable values and are respectively connected in the negative feedback loop and connected between the input of the said amplifier and ground, being such that the ratio between the value of the impedance $Z_{2B}$ which is shunted across the input of the amplifier and the value of the other impedance $Z_{2A}$ is $Z_{2B} = b\, Z_{2A}$, at least one of the two ratios a or b being substantially different from 1 and the ratios $a$ and $b$ and the gain G being connected by the relationship $1 + a - b\,(G-1) = 0$.

2. Electrical filter according to claim 1, of the resonating circuit type of which the transfer function comprises a complex pole, wherein the impedances of the first type are each constituted by an adjustable resistance and the impedances of the second type are each constituted by an adjustable resistance and a capacitor connected in parallel and the input of the filter is connected to the input of the amplifier of gain G through impedances of the first type and the output of this filter is constituted by the output of said amplifier.

3. Electrical filter according to claim 1, of the anti-resonant circuit type of which the transfer function comprises a complex zero, wherein the impedances of the first type are each constituted by an adjustable resistance and a capacitor connected in parallel and the impedances of the second type are constituted by an adjustable resistance and comprising a second amplifier of which the gain is of the order of the reciprocal 1/G of the first and of which the input is connected to the output of this amplifier of gain G, the output of this second amplifier being connected to the input of the amplifier of gain G through impedances of the first type, the input and the output of the filter being respectively constituted by the input and the output of this second amplifier.

4. Electrical filter according to claim 1, wherein the ratios $a$ and $b$ are substantially equal and have a value in the range between 1 and 20.

5. Electrical filter according to claim 1, wherein the ratios a and b are substantially equal and comprised between 1 and 20, and the overvoltage coefficient of the circuit comprising the amplifier of gain G and the impedances of the first and of the second type is greater than 5.

6. Electrical filter according to claim 1, wherein the impedances of the first and of the second type comprise only resistors and reactances of the capacitive type to the exclusion of all other impedance elements.

7. Electrical filter enabling independent control of resonance frequency and of bandwidth, comprising an amplifier whose gain G is of the order of three having an input connected to two impedances $Z_{1A}$ and $Z_{1B}$ of a first type arranged in series with respect to said input and having adjustable and substantially equal values, said amplifier being provided with a negative feedback loop between the output of said amplifier and the junction between said two impedances of the first type, two other impedances $Z_{2A}$ and $Z_{2B}$ of a second type, which have adjustable values and where $Z_{2A}$ is substantially equal to $Z_{2B}$, said second type of impedances being respectively connected in the negative feedback loop and connected between the input of said amplifier and ground.

8. Electrical filter according to claim 7 of the anti-resonant circuit type having a transfer function comprising a complex zero, including a second amplifier whose gain is of the order of a third and whose input is connected to the output of said first amplifier, the output of said second amplifier being connected to the input of said first amplifier through the impedances $Z_{1A}$ and $Z_{1B}$, the input and the output of the filter being respectively constituted by the input and the output of said second amplifier.

9. Electrical filter according to claim 8, wherein the impedances of the first type are each constituted by an adjustable resistance and a condenser connected in parallel to the exclusion of other types of impedance elements and the impedances of the second type are each constituted by an adjustable resistance to the exclusion of other types of impedance elements.

10. Electrical filter according to claim 7, wherein the impedances of the first and of the second type each include only real elements and reactive elements of the capacitive type to the exclusion of all other impedance elements.

11. Electrical filter according to claim 7, wherein the impedances of the first type are each constituted by an adjustable resistance to the exclusion of other types of impedance elements and the impedances of the second type are each constituted by an adjustable resistance and a condenser connected in parallel to the exclusion of other types of impedance elements.

12. Electrical filter according to claim 11, comprising control means independent of the cut-off frequency and of the bandwidth of the filter and adapted to adjust independently the average conductance of at least one of the resistances of the first and second type of impedance of the filter by periodically short-circuiting portions of each of these resistances at a frequency rate distinctly greater than the cut-off frequency of said filter and for periods dependent, for each type of impedance, on the value of a control signal.

13. Electrical filter according to claim 12, wherein at least one resistance of the first and second type of each impedance is divided into two partial resistances of which one is short-circuited as long as a switch connected to the terminals of the partial resistance mentioned receives an energising signal, and control means of the frequency of the filter which receive a control signal expressing, in analogue form and between given values, the value of the frequency (or of the bandwidth) comprise, a generator providing a saw-tooth signal of amplitude comprised between the above-said limits and having a constant period and, a comparator adapted to compare the control signal with the saw-tooth signal to provide to the switches, corresponding to one type of impedance, an energising signal as long as the saw-tooth signal has a value less than the control signal.

14. Electrical filter according to claim 12, wherein at least one resistance of the first and second type of impedance is divided into two partial resistances of which one is short-circuited as long as an electronic switch, connected to the terminals of the partial resistance mentioned, receives an energizing signal, and the means for controlling the frequency which receive a numerical control signal expressing in the form of parallel binary q signals the value of the frequency which value is capable of occupying $2^q$ levels, comprise:

a clock adapted to provide a train of pulses of given frequency and especially greater than the resonance frequency of the filter, a multistage counter adapted to count successively each group of $2^q$ pulses issuing from the clock, a digital comparator adapted to compare the contents of the counter with the control signal, and flip-flop with two control inputs coupled respectively to one stage of said counter and to said comparator, said flip-flop being placed in a first state, in which it provides through its output, to said electronic switch, energizing signals, when the counter counts the last pulse of each group of $2^q$ pulses and being placed in its other state, for which the energizing signals are suppressed, when the comparator detects identity between the contents of the counter and the numerical control signal.

15. Electrical filter according to claim 7, wherein the impedances of the first type are each constituted by an adjustable resistance and a condenser connected in parallel to the exclusion of other types of impedance elements and the impedances of the second type are each constituted by an adjustable resistance to the exclusion of other types of impedance elements.

16. Electrical filter according to claim 7, wherein the impedances of the first type are each constituted by an adjustable resistance to the exclusion of other types of impedance elements and the impedances of the second type are each constituted by an adjustable resistance and a condenser connected in parallel to the exclusion of other types of impedance elements.

* * * * *